US009501660B2

(12) United States Patent
Kim et al.

(10) Patent No.: US 9,501,660 B2
(45) Date of Patent: Nov. 22, 2016

(54) PRIVACY PROTECTION FOR A LIFE-LOG SYSTEM

(71) Applicant: Empire Technology Development LLC, Wilmington, DE (US)

(72) Inventors: Seungil Kim, Seoul (KR); Yang-Won Jung, Seoul (KR)

(73) Assignee: Empire Technology Development LLC, Wilmington, DE (US)

( * ) Notice: Subject to any disclaimer, the term of this patent is extended or adjusted under 35 U.S.C. 154(b) by 102 days.

(21) Appl. No.: 14/372,925

(22) PCT Filed: Jul. 8, 2013

(86) PCT No.: PCT/US2013/049520
§ 371 (c)(1),
(2) Date: Jul. 17, 2014

(87) PCT Pub. No.: WO2015/005892
PCT Pub. Date: Jan. 15, 2015

(65) Prior Publication Data
US 2015/0067885 A1 Mar. 5, 2015

(51) Int. Cl.
G06F 7/04 (2006.01)
G06F 21/62 (2013.01)
H04L 12/18 (2006.01)
H04L 12/58 (2006.01)

(52) U.S. Cl.
CPC ....... *G06F 21/6245* (2013.01); *H04L 12/1813* (2013.01); *H04L 51/32* (2013.01)

(58) Field of Classification Search
CPC ..... H04L 63/08; H04L 63/083; H04L 63/10; H04L 51/32; H04L 63/102; H04L 12/18; G06F 21/62; G06F 21/10
See application file for complete search history.

(56) References Cited

U.S. PATENT DOCUMENTS

| 8,209,399 | B2 | 6/2012 | Sathish | |
|---|---|---|---|---|
| 8,271,463 | B2* | 9/2012 | Fish et al. | 707/702 |
| 2012/0016817 | A1* | 1/2012 | Smith et al. | 706/12 |
| 2013/0063550 | A1 | 3/2013 | Ritchey et al. | |
| 2013/0080544 | A1* | 3/2013 | Lyons | 709/206 |
| 2013/0086023 | A1 | 4/2013 | Tsukamoto | |
| 2013/0159115 | A1* | 6/2013 | Adams | 705/14.66 |
| 2013/0304763 | A1* | 11/2013 | Esposito et al. | 707/783 |
| 2014/0040371 | A1* | 2/2014 | Gurevich et al. | 709/204 |
| 2014/0282096 | A1* | 9/2014 | Rubinstein et al. | 715/753 |

OTHER PUBLICATIONS

Facebook Help Center: "Can I change the audience for something I share after I share it?", https://www.facebook.com/help/233739099984085, Feb. 2, 2013.*

(Continued)

*Primary Examiner* — Ali Abyaneh
(74) *Attorney, Agent, or Firm* — Brundidge & Stanger, P.C.

(57) ABSTRACT

Technologies are generally described for privacy protection for a life-log system. In some examples, a method performed under control of a life-log system may include receiving, from a user account, a request to change one or more real life-log data entries relating to a real event that are stored in a first part of a database; removing the one or more real life-log data entries relating to the real event from the first part of the database; and storing, in the first part of the database, one or more misleading life-log data entries relating to a false event corresponding to the real event.

18 Claims, 8 Drawing Sheets

(56) References Cited

OTHER PUBLICATIONS

Wanying Luo et al.: "FaceCloak: An Architecture for User Privacy on Social Networking Sites," IEEE, Computational Science and Engineering, 2009. CSE '09. International Conference on Aug. 29-31, 2009, vol. 3, Vancouver, BC, pp. 26-33.*
Get a Lifelog | The Economist, http://www.economist.com/news/business/21577380-device-records-every-30-seconds-your-life-get-lifelog, May 11, 2013.*
"UbigLog: a generic mobile phone-based life-log framework", Personal and Ubiquitous Computing, Apr. 2013, vol. 17, Issue 4, pp. 621-637.*
Facebook "Only Me" Definition: "What does the "Only Me" Privacy Setting Mean?", http://www.facebook.com/help/275599715852133, Dec. 10, 2012.*
Needleman, R. ("New Path 2.0 Automatically Chronicles, Shares Your Life", @CBS Interactive, CNET News, Nov. 29, 2011, pp. 1-5.*
Chaudhari, J. S., "Privacy Protection for Life-log System," 2007, University of Kentucky, Electrical Engineering, pp. 1-103.
Desmond Elliot et al., "An Architecture for Life-long User Modelling," Department of Computing Science, University of Glasgow, Jul. 27, 2009, pp. 1-9.
International Search Report and written opinion for the PCT Application No. PCT/US2013/049520 mailed on Feb. 2, 2014.
"Lifelog," Wikipedia, accessed at: http://web.archive.org/web/20130424134508/http://en.wikipedia.org/wiki/Lifelog, accessed on Jul. 11, 2014, pp. 8.
Needleman, R., "New Path 2.0 automatically chronicles, shares your life," @CBS Interactive, CNET News, Nov. 29, 2011, pp. 1-5.
Rawassizadeh, R. and Tjoa, A M., "Securing Shareable Life-logs," IEEE, Social Computing (SocialCom), 2010 IEEE Second International Conference on Aug. 20-22, 2010, Minneapolis, MN, pp. 1105-1110.
Rawassizadeh, R., "Towards sharing life-log information with society," Behaviour & Information Technology, Taylor & Francis, vol. 31, No. 11, Nov. 2012, pp. 1057-1067.
Wanying Luo et al., "FaceCloak: An Architecture for User Privacy on Social Networking Sites," IEEE, Computational Science and Engineering, 2009. CSE '09. International Conference on Aug. 29-31, 2009, vol. 3, Vancouver, BC, pp. 26-33.

* cited by examiner

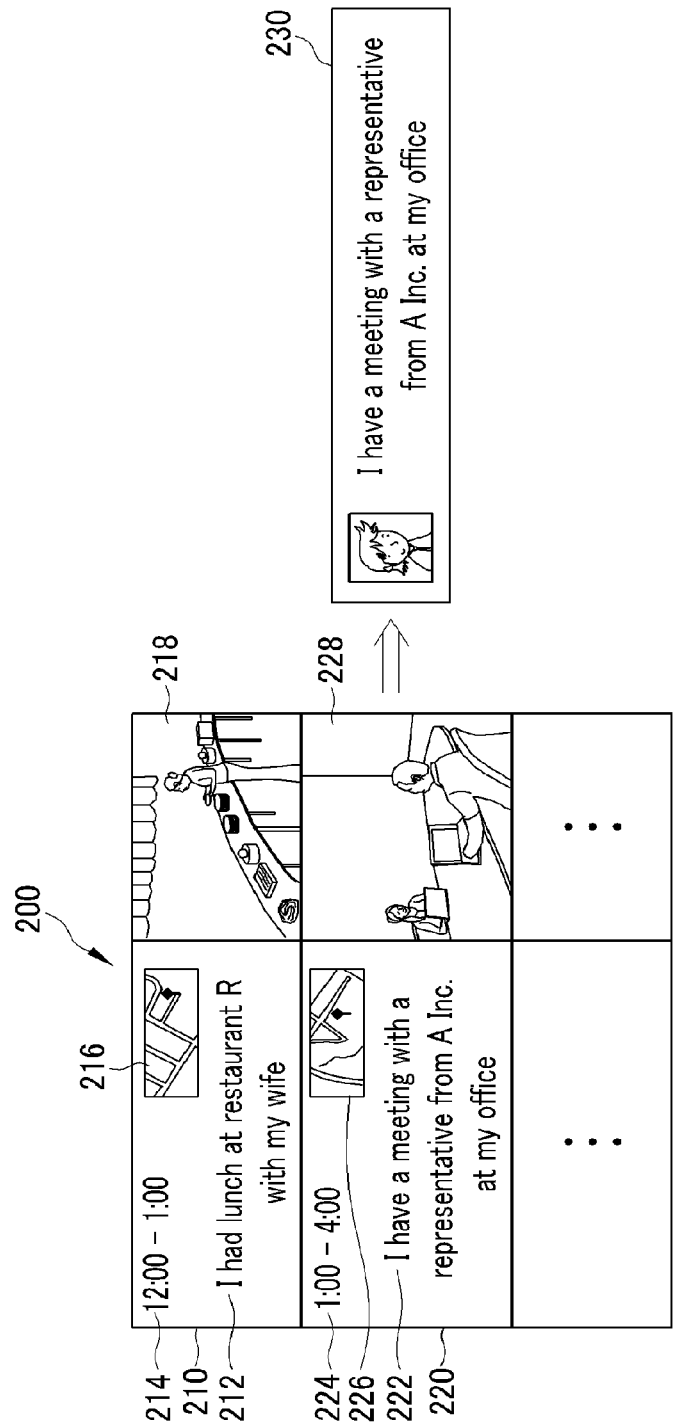

PRIVACY PROTECTION FOR A LIFE-LOG SYSTEM

CROSS-REFERENCE TO RELATED APPLICATION

This Application is the U.S. National Stage filing under 35 U.S.C. §371 of PCT Application Ser. No. PCT/US13/49520 filed on Jul. 8, 2013. The disclosure of the PCT Application is hereby incorporated herein by reference in its entirety.

BACKGROUND

Life-logging is a social act of storing and/or sharing one's life events in an open and public forum. Life-logging on the Internet is considered a form of on-line social networking A life-log system may record information regarding every moment or milestone for a particular user (i.e., life-log information), and provide the information to a social networking service (SNS) server, so that the information may be shared with others through the SNS.

SUMMARY

In an example, a method performed under control of a life-log system may include receiving, from a user account, a request to change one or more real life-log data entries relating to a real event that are stored in a first part of a database; removing the one or more real life-log data entries relating to the real event from the first part of the database; and storing, in the first part of the database, one or more misleading life-log data entries relating to a false event corresponding to the real event.

In another example, a computer-readable storage medium may store thereon computer-executable instructions that, in response to execution, cause a life-log system to perform operations, including receiving, from a user account, a request to change one or more real life-log data entries relating to a real event among multiple life-log data entries associated with the user account; and replacing the one or more real life-log data entries relating to the real event with one or more misleading life-log data entries relating to a false event.

In yet another example, a life-log system may include a life-log information collection unit configured to collect one or more real life-log data entries relating to a real event associated with a user account; a misleading life-log data generator unit configured to generate one or more misleading life-log data entries relating to a false event, in response to a request from the user account; and a life-log data management unit configured to replace the one or more real life-log data entries with the one or more misleading life-log data entries.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIGS. 2A-B schematically show illustrative examples of real and misleading life-log data entries, arranged in accordance with at least some embodiments described herein;

DETAILED DESCRIPTION

Figure 1:
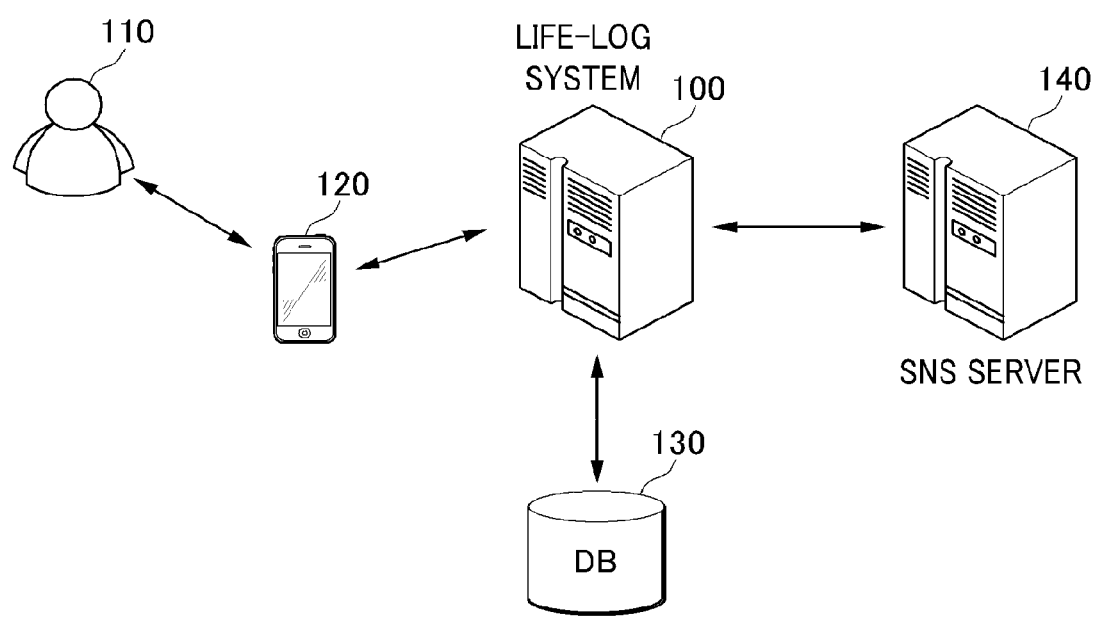
FIG. 1 schematically shows an illustrative example of an environment in which a life-log system provides a privacy protection scheme, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to a life-log system. Further, technologies are herein generally described for privacy protection for the life-log system.

In some examples, the life-log system may collect one or more real life-log data entries relating to a real event associated with a user. For instance, when the life-log system determines that the user did, is doing or plans to do an activity (i.e., a real event), the life-log system may collect, e.g., time information (such as a specific time and/or a period of time), location information (such as a specified location), and/or photos, audio clips and/or video clips associated with the activity automatically and/or based on input by the user. Then, the life-log system may store the real life-log data entries into a specified portion (i.e., a first part) of a database. The database may be an internal part of the life-log system, or otherwise accessed, controlled, and/or hosted by the life-log system.

In some examples, the life-log system may interwork with a social networking service (SNS) server hosting an SNS, so that at least some of the one or more real life-log data entries may be posted on the SNS. That is, the life-log system may serve as an archive of the user's life events, as well as allow the user to share life events with others through the SNS.

In some examples, when the user requests to change or conceal one or more real life-log data entries relating to the real event, the life-log system may replace the one or more real life-log data entries relating to the real event with one or more misleading life-log data entries relating to the life event, though more typically relating to a false event, and may further provide the SNS server with the one or more misleading life-log data entries. For instance, the false event may be determined as a past event or a future event taking place concurrently with the real event, that is, starting when the real event starts and ending when the real event ends. By way of example, but not limitation, the life-log system may generate the one or more misleading life-log data entries based at least in part on the false event designated by the user, and/or previous life-log data entries of the user and/or other users. By way of another example, but not limitation, the one or more misleading life-log data entries may be pre-generated and stored in another part (e.g., a second part) of the database.

In some further examples, upon receiving, from the user, the request to change the one or more real life-log data entries relating to the real event, the life-log system may remove the one or more real life-log data entries relating to the real event from the first part of the database, and store the removed one or more real life-log data entries in a second part of the database. Further, the life-log system may store, in the first part of the database, the one or more misleading life-log data entries. Then, in some examples, when the life-log system determines that the real event has finished and/or receives, from the user, a request to restore the one or more real life-log data entries relating to the real event, the life-log system may remove the one or more misleading life-log data entries relating to the false event from the first part of the database, and restore, in the first part of the database, the one or more real life-log data entries relating to the real event.

FIG. 1 schematically shows an illustrative example of an environment in which a life-log system 100 provides a privacy protection scheme, arranged in accordance with at least some embodiments described herein.

As depicted, life-log system 100 may provide a user 110, who uses an electronic device 120, with a life-log service. User 110 may use his/her user account to log on to life-log system 100 (e.g., in a form of a server, one or more segments of a server farm or a server cluster) from electronic device 120 to use the life-log service. Electronic device 120 may be of any type of electronic device configured to store, retrieve, compute, transmit and/or receive data, including, for example, a smartphone, a mobile phone, a personal digital assistant (PDA), a tablet, a personal computer such as a laptop computer or a desktop computer, a television, glasses, a watch, etc. Although FIG. 1 illustrates that user 110 uses one electronic device (i.e., electronic device 120) to use the life-log service, those skilled in the art will readily appreciate that user 110 may use any number of devices.

In some embodiments, life-log system 100 may collect one or more real life-log data entries relating to a real event associated with user 110. For instance, life-log system 100 may collect the one or more real life-log data entries from electronic device 120 and/or other devices owned or controlled by user 110, that may be configured to receive input from user 110 and/or continuously or intermittently monitor a surrounding environment of user 110 (e.g., by continuously or intermittently capturing images, audios and/or videos using cameras and/or microphones of electronic device 120 and/or the other devices). The real life-log data entries may include, but are not limited to, scheduling data (including, e.g., time and/or location information regarding the real event), an image file, an audio file, a video file, or history data of electronic device 120 (including, e.g., location information regarding the real event, such as GPS log data). By way of example, but not limitation, when the real event is a lunch appointment, the real life-log data entries may include information regarding when, where, and/or with whom the user had, has or will have the lunch, a photo, an audio clip or a video clip captured at the lunch, or so on. By way of another example, but not limitation, when the real event is a meeting, the real life-log data entries may include information regarding when, where, and/or with whom the user had, has or will have the meeting, a photo, an audio clip or a video clip captured at the meeting, or so on.

In some embodiments, life-log system 100 may access a database 130, which may be configured to store the one or more real life-log data entries associated with user 110. By way of example, but not limitation, database 130 may be a cloud data center communicatively connected to life-log system 100. Although FIG. 1 illustrates that database 130 is a separate component from life-log system 100, database 130 may alternatively be an internal part of life-log system 100 depending on implementation.

In some embodiments, life-log system 100 may provide or upload the one or more real life-log data entries associated with user 110 to a social networking service (SNS) server 140, which may be communicatively connected to life-log system 100. Then, SNS server 140 may post at least some of the one or more real life-log data entries, partially or in their entirety, so that user 110 may share his/her life events with his/her social network friends or contacts. Electronic device 120, life-log system 100 and SNS server 140 may be communicatively coupled to one another over a network such as, for example, the Internet, a cellular network, a wide area network (WAN), a metropolitan area network (MAN), a local area network (LAN), a campus area network (CAN), a virtual private network (VPN), etc.

In some further embodiments, when user 110 requests to change or conceal the one or more real life-log data entries relating to the real event, electronic device 120 may transmit, to life-log system 100, such a request to change. In response to receiving the request to change, life-log system 100 may generate one or more misleading life-log data entries relating to the real event or, more typically to a false event, and replace the one or more real life-log data entries relating to the real event with the one or more misleading life-log data entries relating to the false event. Then, life-log system 100 may provide SNS server 140 with the one or more misleading life-log data entries. Life-log system 100 may generate the false event based on designation by user 110, and/or previous events of user 110 or other users (e.g., what user 110 did at the same time of the last year, what other associated users did at the same time of the last month, etc.). Alternatively and/or additionally, life-log system 100 may generate the one or more misleading life-log data entries based on designation by user 110, and/or previous life-log data entries associated with user 110 or other users. Alternatively and/or additionally, the one or more misleading life-log data entries may be pre-generated and thus stored in database 130.

In some embodiments, life-log system 100 may store the collected one or more real life-log data entries relating to the real event in a first part of database 130. Then, in response to the request to change, life-log system 100 may remove the one or more real life-log data entries relating to the real event from the first part of database 130, partially or in their entirety, and store the removed one or more real life-log data entries in a second part of database 130. Further, life-log system 100 may store, in the first part of database 130, the one or more misleading life-log data entries relating to the false event.

In some further embodiments, life-log system 100 may determine that the real event has ended, and/or may receive, from electronic device 120, a request to restore the one or more real life-log data entries relating to the real event. In response, life-log system 100 may remove the one or more misleading life-log data entries relating to the false event from the first part of database 130; and restore, in the first part of database 130, the one or more real life-log data entries relating to the real event.

Figure 2B:
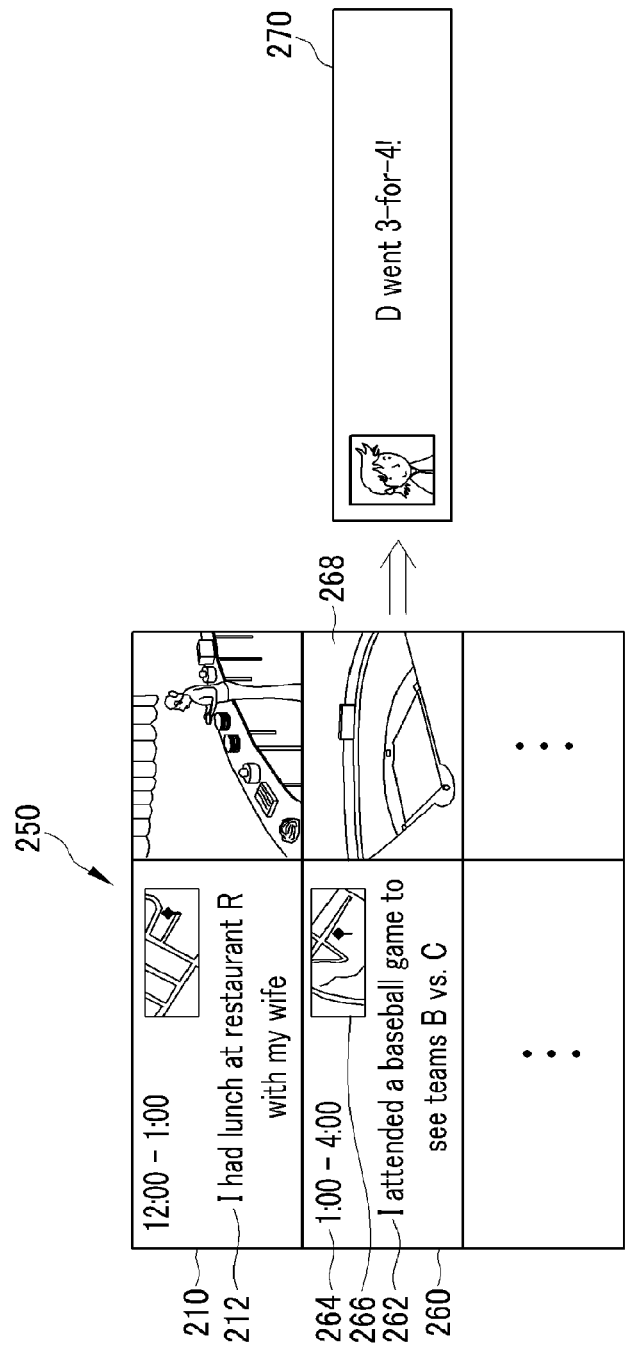

FIGS. 2A-B schematically show illustrative examples of real and misleading life-log data entries, arranged in accordance with at least some embodiments described herein. Reference may be made to the embodiments depicted and described with reference to FIG. 1.

FIG. 2A depicts example list 200 of life-log data entries of user 110, including real life-log data entries 210 relating to a first real event (e.g., a lunch appointment) and real life-log data entries 220 relating to a second real event (e.g., a meeting). As depicted, real life-log data entries 210 may include an event description 212 ("I had lunch at restaurant R with my wife"), time information 214 including a start time and an end time ("12:00-1:00"), location information 216, and a captured image 218. Similarly, real life-log data entries 220 may include an event description 222 ("I have a meeting with a representative from A Inc. at my office"), time information 224 including a start time and an end time ("1:00-4:00"), location information 226, and a captured image 228. Real life-log data entries 210 and 220 may further include other information although not illustrated in FIG. 2A.

In some embodiments, when life-log system 100 transmits real life-log data entries 220 to SNS server 140, SNS server 140 may present or display to user 110 and/or his/her social network friends or contacts a post 230 that includes at least a portion of real life-log data entries 220. For instance, as illustrated in FIG. 2A, post 230 may include event description 222.

In some embodiments, when user 110 requests to change real life-log data entries 220 (e.g., because user 110 does not want to disclose the second real event to others), life-log system 100 may generate misleading life-log data entries 260 relating to a false event (e.g., attending a baseball game) to replace real life-log data entries 220, as depicted in FIG. 2B. For instance, the false event may be designated by user 110, or be associated with previous events of user 110 or other relevant users (e.g., social network friends).

FIG. 2B depicts example list 250 of life-log data entries of user 110, including real life-log data entries 210 relating to the first real event and misleading life-log data entries 260 relating to the false event. As depicted, misleading life-log data entries 260 may include an event description 262 ("I attended a baseball game to see teams B vs. C"), time information 264 including a start time and an end time ("1:00-4:00"), which may be the same as the start time and/or the end time of the second real event, location information 266, and a captured image 268. Misleading life-log data entries 260 may further include other information regarding the false event (e.g., score of the baseball game, performance of hitters and pitchers, weather of a ballpark, etc.) although not illustrated in FIG. 2B.

In some embodiments, when life-log system 100 transmits misleading life-log data entries 260 to SNS server 140, SNS server 140 may present or display a post 270 including at least a portion of misleading life-log data entries 260. For instance, as illustrated in FIG. 2B, post 270 may include information regarding performance of a hitter in the baseball game that user 110 allegedly attended, all in an effort to support the misleading life-log data entry.

Figure 3:
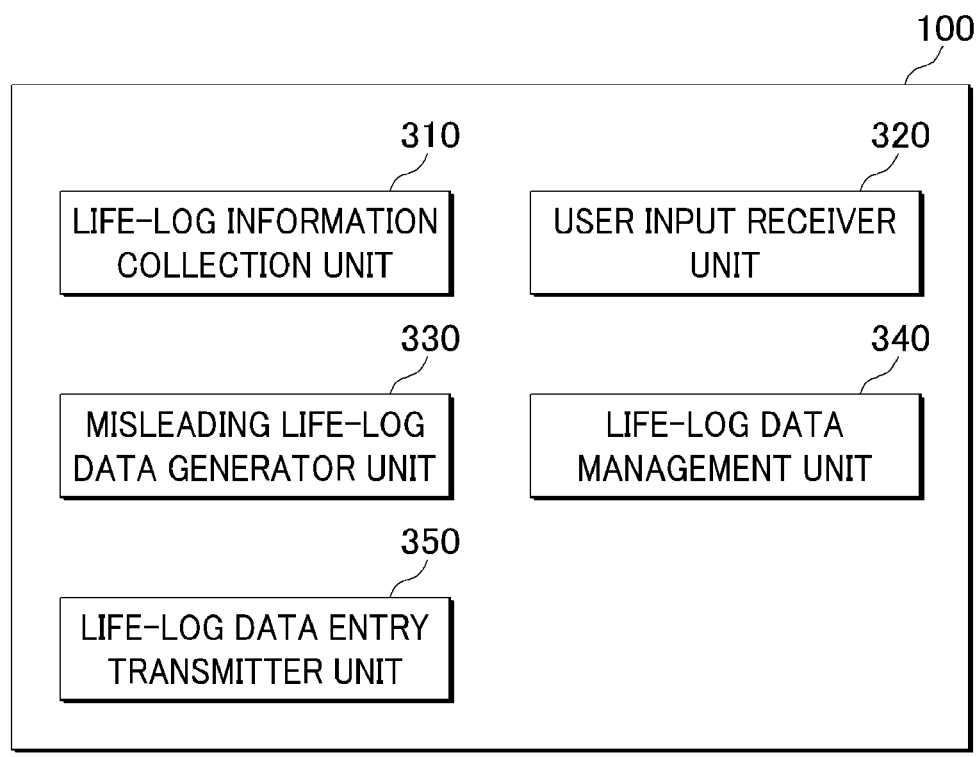
FIG. 3 shows a schematic block diagram illustrating an example architecture of a life-log system for implementing a privacy protection scheme, arranged in accordance with at least some embodiments described herein.

FIG. 3 shows a schematic block diagram illustrating an example architecture of life-log system 100 for implementing a privacy protection scheme, arranged in accordance with at least some embodiments described herein. Reference may be made to the embodiments depicted and described with reference to FIGS. 1-2.

As depicted, life-log system 100 may include a life-log information collection unit 310, a user input receiver unit 320, a misleading life-log data generator unit 330, a life-log data management unit 340, and a life-log data entry transmitter unit 350. Although illustrated as discrete components, various components may be divided into additional components, combined into fewer components, or eliminated while being contemplated within the scope of the disclosed subject matter. It will be understood by those skilled in the art that each function and/or operation of the components may be implemented, individually and/or collectively, by a wide range of hardware, software, firmware, or virtually any combination thereof.

Life-log information collection unit 310 may be configured to collect one or more real life-log data entries relating to a real event associated with a user account (e.g., of user 110). In some embodiments, life-log information collection unit 310 may be configured to collect the one or more real life-log data entries automatically and/or based on input from the user account.

User input receiver unit 320 may be configured to receive a request from the user account. In some embodiments, the request may be a request to change the one or more real life-log data entries relating to the real event, or a request to restore the one or more real life-log data entries relating to the real event.

Misleading life-log data generator unit 330 may be configured to generate one or more misleading life-log data entries relating to a false event. In some embodiments, misleading life-log data generator unit 330 may be configured to generate the one or more misleading life-log data entries when user input receiver unit 320 receives, from the user account, the request to change. Alternatively and/or additionally, misleading life-log data generator unit 330 may be configured to generate the one or more misleading life-log data entries before user input receiver unit 320 receives, from the user account, the request to change. By way of example, but not limitation, user 110 may designate the false event, or alternatively, misleading life-log data generator unit 330 may generate the false event based on previous events of user 110 or other users (e.g., what user 110 did at the same time of the last year, what other associated users did at the same time of the last month, etc.). Then, misleading life-log data generator unit 330 may generate the one or more misleading life-log data entries based on life-log data entries associated with the false event. Alternatively and/or additionally, user 110 may designate the one or more misleading life-log data entries.

Life-log data management unit 340 may be configured to replace the one or more real life-log data entries with the one or more misleading life-log data entries generated by misleading life-log data generator unit 330 (e.g., by removing the one or more real life-log data entries from a first part of database 130, storing the removed one or more real life-log data entries in a second part of database 130, and storing the one or more misleading life-log data entries in the first part of database 130), when user input receiver unit 320 receives, from the user account, the request to change. Life-log data management unit 340 may be further configured to restore the one or more real life-log data entries (e.g., by removing the one or more misleading life-log data entries from the first part of database 130, and restoring the one or more real life-log data entries in the first part of database 130), when user input receiver unit 320 receives, from the user account, the request to restore.

Life-log data entry transmitter unit 350 may be configured to transmit, to SNS server 140, the one or more misleading life-log data entries generated by misleading life-log data generator unit 330, in response to the request to change received by user input receiver unit 320. Life-log data entry transmitter unit 350 may be further configured to transmit, to SNS server 140, the one or more real life-log data entries relating to the real event in absence of the request to change from the user account, or in response to the request to restore received by user input receiver unit 320.

Figure 4:
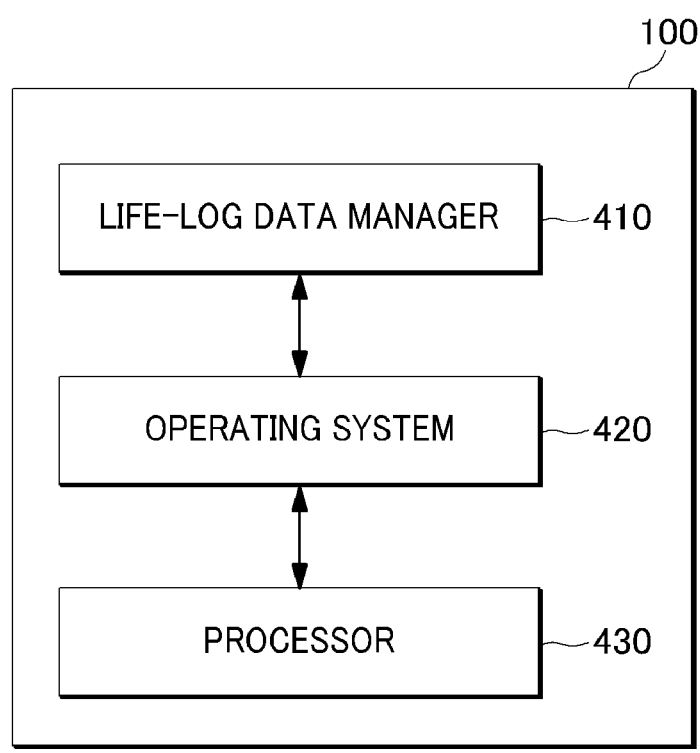
FIG. 4 shows a schematic block diagram illustrating another example architecture of a life-log system for implementing a privacy protection scheme, arranged in accordance with at least some embodiments described herein.

FIG. 4 shows a schematic block diagram illustrating another example architecture of life-log system 100 for implementing a privacy protection scheme, arranged in accordance with at least some embodiments described herein. Reference may be made to the embodiments depicted and described with reference to FIGS. 1-3.

As depicted, life-log system 100 may include a life-log data manager 410, an operating system 420 and a processor 430. Life-log data manager 410 may be an application adapted to operate on operating system 420 such that the privacy protection scheme, as described herein, may be provided. Operating system 420 may allow life-log data manager 410 to manipulate processor 430 to implement the privacy protection scheme as described herein.

In some embodiments, life-log data manager 410 may include one or more components or program modules respectively adapted to implement functions of misleading life-log data generator unit 330 and life-log data management unit 340 as illustrated in FIG. 3.

Figure 5:
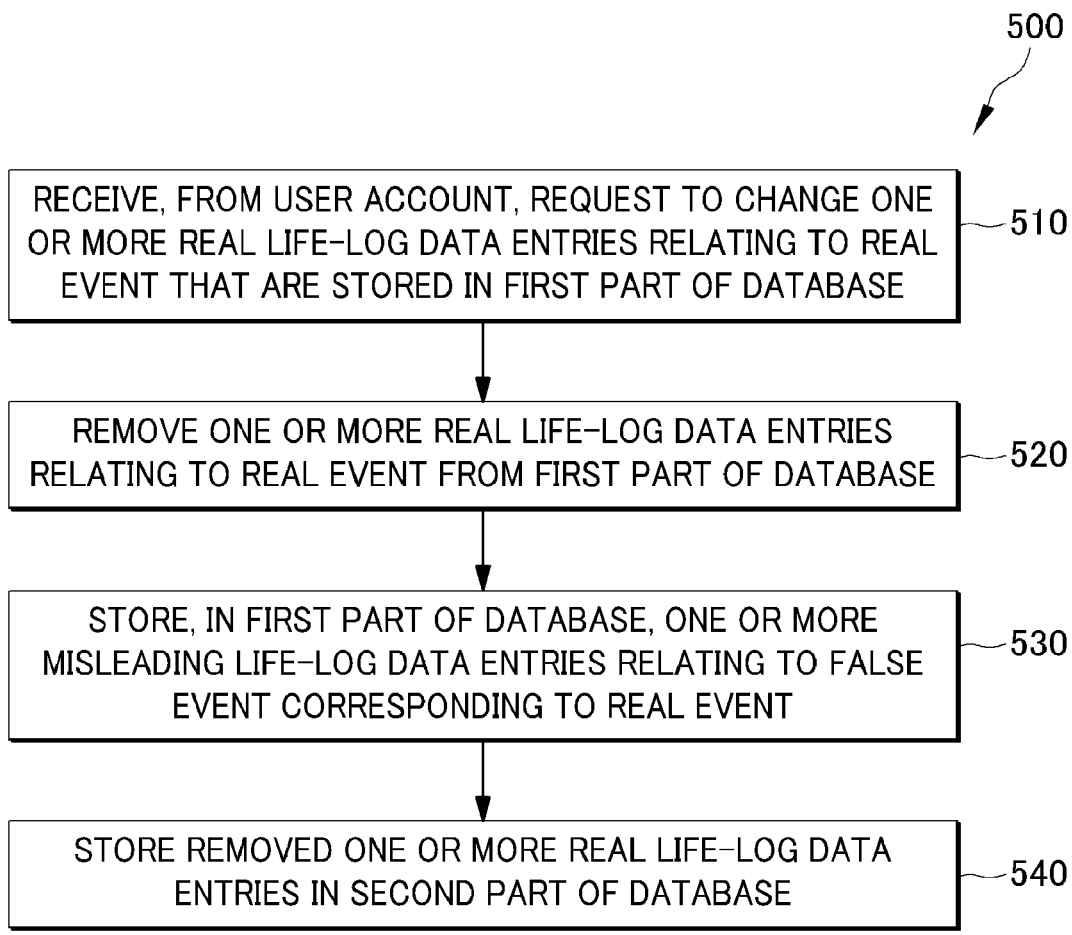
FIG. 5 shows an example flow diagram of a process for a life-log system implementing a privacy protection scheme, arranged in accordance with at least some embodiments described herein.

FIG. 5 shows an example flow diagram of a process 500 for life-log system 100 implementing a privacy protection scheme, arranged in accordance with at least some embodiments described herein.

Process 500 may be implemented in a life-log system such as life-log system 100 including life-log information collection unit 310, user input receiver unit 320, misleading life-log data generator unit 330, life-log data management unit 340 and life-log data entry transmitter unit 350. Process 500 may also be implemented by computer programs or program modules that are adapted to provide the privacy protection scheme and hosted by a platform, such as life-log data manager 410. Thus, reference may be made to the embodiments depicted and described with reference to FIGS. 1-4. Process 500 may include one or more operations, actions, or functions as illustrated by one or more blocks 510, 520, 530, and/or 540. Although illustrated as discrete blocks, various blocks may be divided into additional blocks, combined into fewer blocks, or eliminated, depending on the desired implementation. Processing may begin at block 510.

At block 510 (Receive, from User Account, Request to Change One or More Real Life-Log Data Entries Relating to Real Event that are stored in First Part of Database), life-log system 100 (e.g., user input receiver unit 320) may receive, from a user account (e.g., of user 110), a request to change one or more real life-log data entries relating to a real event that are stored in a first part of database 130. Processing may continue from block 510 to block 520.

At block 520 (Remove One or More Real Life-Log Data Entries Relating to Real Event from First Part of Database), life-log system 100 (e.g., life-log data management unit 340) may remove the one or more real life-log data entries relating to the real event from the first part of database 130. Processing may continue from block 520 to block 530.

At block 530 (Store, in First Part of Database, One or More Misleading Life-Log Data Entries Relating to False Event Corresponding to Real Event), life-log system 100 (e.g., life-log data management unit 340) may store, in the first part of database 130, one or more misleading life-log data entries relating to a false event corresponding to the real event. Processing may continue from block 530 to block 540.

At block 540 (Store Removed One or More Real Life-Log Data Entries in Second Part of Database), life-log system 100 (e.g., life-log data management unit 340) may store the removed one or more real life-log data entries in a second part of database 130.

As such, when user 110 does not want to disclose to or share with others some of his/her life events, life-log system 100 may provide SNS server 140 with misleading life-log data entries relating to a false event instead of real life-log data entries relating to a real event to be concealed, thereby enhancing privacy protection.

For this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 6:
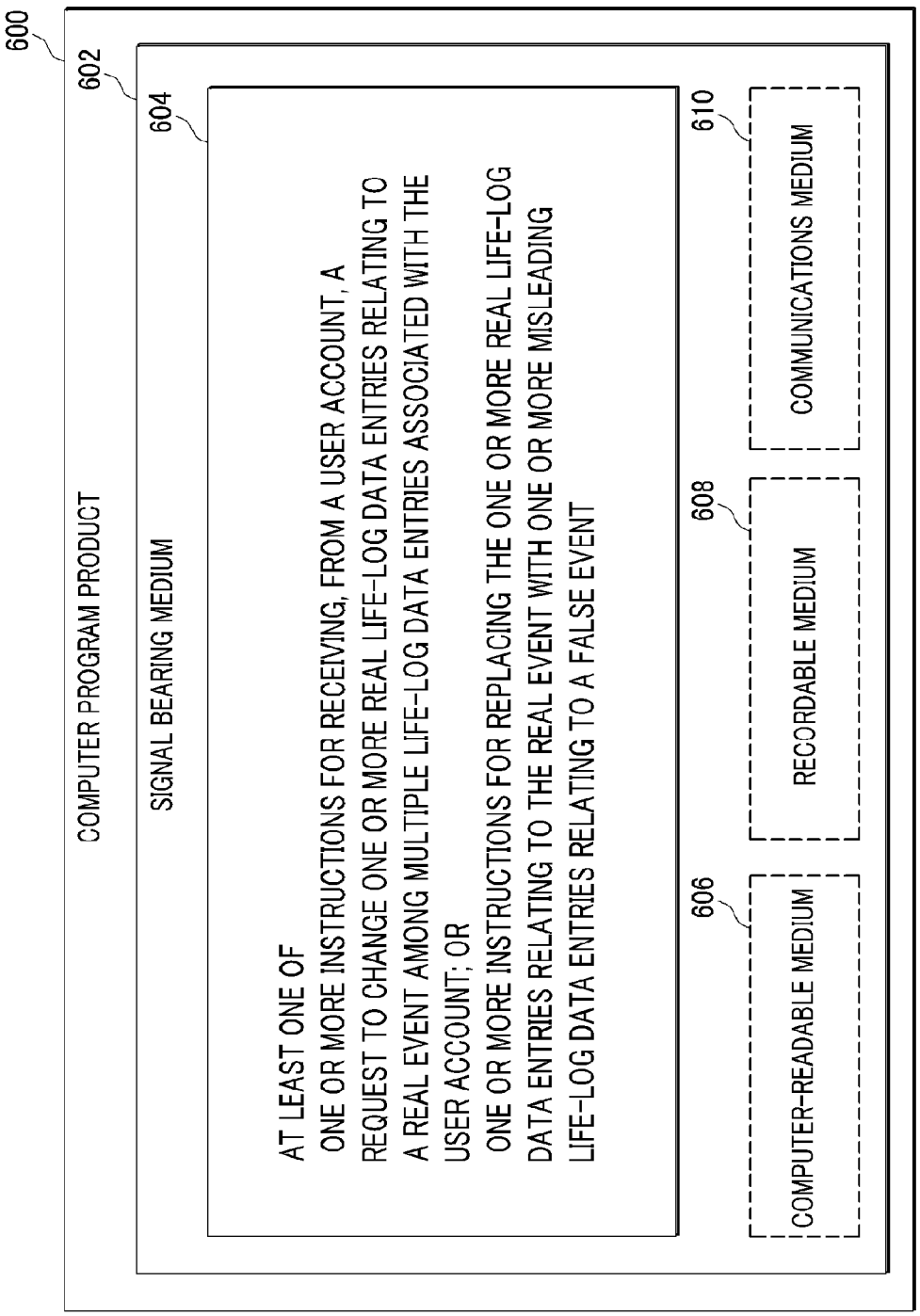
FIG. 6 illustrates an example computer program product that may be utilized to implement a privacy protection scheme, arranged in accordance with at least some embodiments described herein.

FIG. 6 illustrates an example computer program product 600 that may be utilized to implement a privacy protection scheme, arranged in accordance with at least some embodiments described herein.

As depicted, computer program product 600 may include a signal bearing medium 602. Signal bearing medium 602 may include one or more instructions 604 that, when executed by, for example, a processor of life-log system 100, may provide the functionality described above with respect to FIGS. 1-5. By way of example, instructions 604 may include: one or more instructions for receiving, from a user account, a request to change one or more real life-log data entries relating to a real event among multiple life-log data entries associated with the user account; or one or more instructions for replacing the one or more real life-log data entries relating to the real event with one or more misleading life-log data entries relating to a false event.

In some implementations, signal bearing medium 602 may encompass a computer-readable medium 606, such as, but not limited to, a hard disk drive, a CD, a DVD, a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, computer program product 600 may be conveyed to one or more modules of life-log system 100 by an RF signal bearing medium 602, where the signal bearing medium 602 is conveyed by a wireless communications medium 610 (e.g., a wireless communications medium conforming with the IEEE 802.11 standard).

Figure 7:
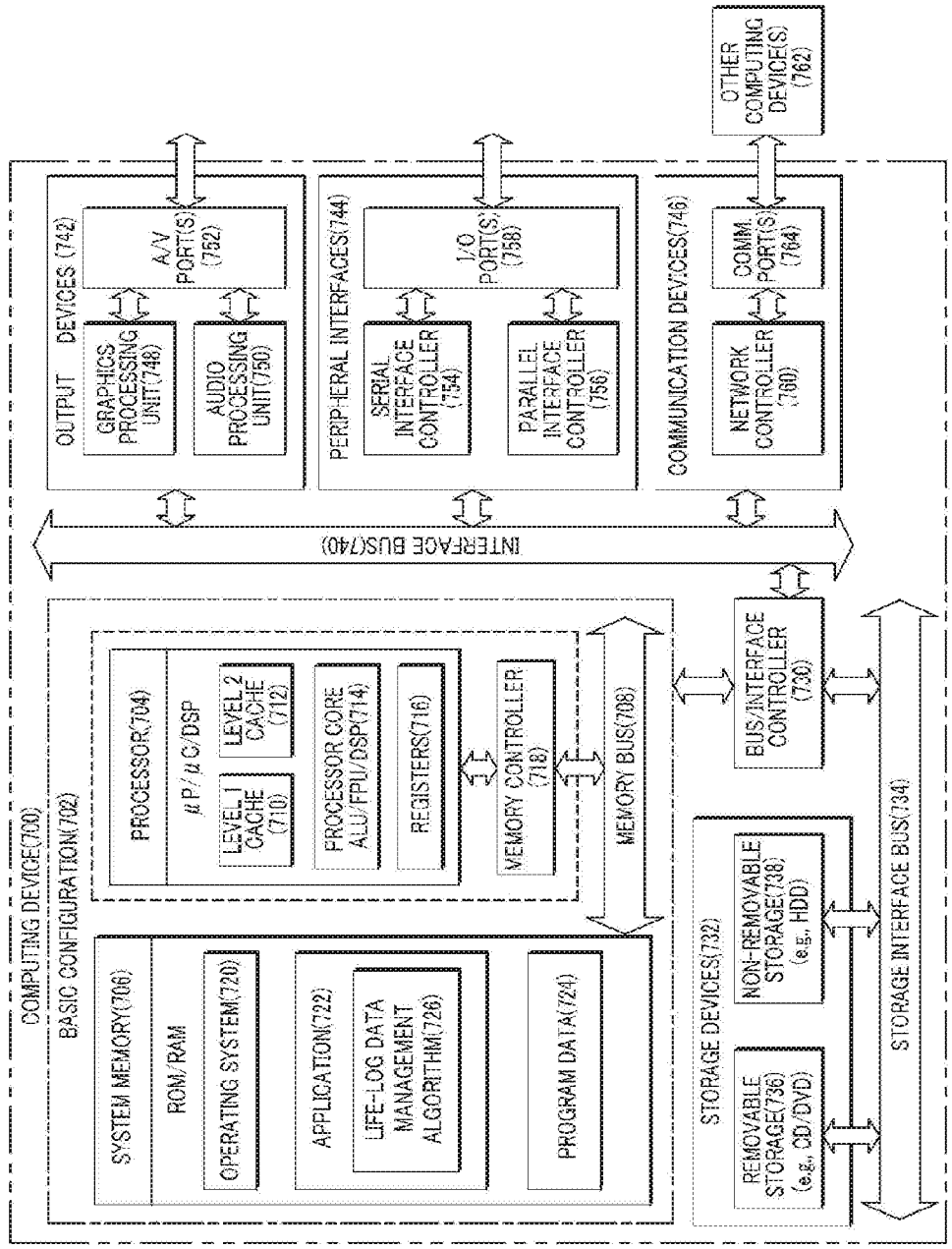
FIG. 7 is a block diagram illustrating an example computing device that may be utilized to implement a privacy protection scheme, arranged in accordance with at least some embodiments described herein.

FIG. 7 is a block diagram illustrating an example computing device 700 that may be utilized to implement a privacy protection scheme, arranged in accordance with at least some embodiments described herein.

In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (μP), a microcontroller (μC), a digital signal processor (DSP), or any combination thereof. Processor 704 may include one or more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), nonvolatile memory (such as ROM, flash memory, etc.) or any combination thereof. System memory 706 may include an operating system 720, one or more applications 722, and program data 724.

Application 722 may include a life-log data management algorithm 726 that may be arranged to perform the functions as described herein including the actions described with respect to the life-log system 100 architecture as shown in FIGS. 3-4 or including the actions described with respect to the flow chart shown in FIG. 5. Program data 724 may include any data that may be useful for providing the privacy protection scheme as is described herein. In some examples, application 722 may be arranged to operate with program data 724 on an operating system 720 such that the privacy protection scheme as described herein may be provided.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of a life-log system, comprising:
   receiving, from a user account, a request to change one or more real life-log data entries relating to a real event that are stored in a first part of a database, each of the one or more real life-log data entries being associated with an event and a time;
   removing the one or more real life-log data entries relating to the real event from the first part of the database;
   generating one or more misleading life-log data entries relating to a false event, the generated one or more misleading life-log data entries being based on prior real life-log data entries associated with the user account or another user account, each of the prior real life-log data entries being associated with a prior event and a prior time, the prior time associated with the prior real life-log data entry being same as the time associated with the real life-log data entry but on a previous day;
   storing, in the first part of the database, the one or more misleading life-log data entries;
   storing the removed one or more real life-log data entries in a second part of the database;
   providing the one or more misleading life-log data entries to a social networking service (SNS) server communicatively connected to the life-log system in response to the request to change from the user account; and
   providing the one or more real life-log data entries relating to the real event to the SNS server in absence of the request to change from the user account.

2. The method of claim 1, wherein the generating the one or more misleading life-log data entries is further based on a future event.

3. The method of claim 1, wherein the real event includes at least one of a specific time, a period of time, or a specified location.

4. The method of claim 1, further comprising:
receiving, from the user account, information regarding the false event; and
wherein the generating the one or more misleading life-log data entries is further based on the received information regarding the false event.

5. The method of claim 1,
wherein the one or more misleading life-log data entries are received from the user account or the another user account.

6. The method of claim 1, wherein the one or more misleading life-log data entries are pre-generated and are stored in the second part of the database.

7. The method of claim 1, wherein the one or more real life-log data entries include scheduling data, an image file, an audio file, a video file, or history data of a user device that is associated with the user account.

8. The method of claim 1, wherein the life-log system includes the database.

9. The method of claim 1, wherein the database is a cloud data center communicatively connected to the life-log system.

10. The method of claim 1, further comprising:
determining that the real event is finished; and
restoring, in the first part of the database, the one or more real life-log data entries relating to the real event.

11. The method of claim 1, further comprising:
receiving, from the user account, a request to restore the one or more real life-log data entries relating to the real event;
removing the one or more misleading life-log data entries relating to the false event from the first part of the database; and
restoring, in the first part of the database, the one or more real life-log data entries relating to the real event.

12. A non-transitory computer-readable storage medium having stored thereon computer-executable instructions that, in response to execution, cause a life-log system to perform operations, comprising:
receiving, from a user account, a request to change one or more real life-log data entries relating to a real event among a plurality of life-log data entries associated with the user account, the plurality of life-log data entries associated with the user account being stored in a first part of a database, each of the one or more real life-log data entries being associated with an event and a time;
generating one or more misleading life-log data entries relating to a false event based on prior real life-log data entries associated with the user account or another user account, each of the prior real life-log data entries being associated with a prior event and a prior time, the prior time associated with the prior real life-log data entry being same as the time associated with the real life-log data entry but on a previous day;
replacing the one or more real life-log data entries relating to the real event with the one or more misleading life-log data entries relating to the false event;
storing, in a second part of the database, the one or more replaced real life-log data entries relating to the real event;
providing a social networking service (SNS) server with the one or more misleading life-log data entries in response to the request to change from the user account; and
providing the SNS server with the one or more real life-log data entries relating to the real event in absence of the request to change from the user account.

13. The non-transitory computer-readable storage medium of claim 12, wherein the real event includes at least one of a specific time, a period of time, or a specified location.

14. The non-transitory computer-readable storage medium of claim 12, wherein the plurality of life-log data entries associated with the user account include scheduling data, an image file, an audio file, a video file, or history data of a user device that is associated with the user account.

15. The non-transitory computer-readable storage medium of claim 12, wherein the operations further comprise:
receiving, from the user account, information regarding the false event; and
wherein the generating the one or more misleading life-log data entries is further based on the information.

16. The non-transitory computer-readable storage medium of claim 12, wherein the one or more misleading life-log data entries are pre-generated and stored in the database.

17. A life-log system comprising:
a memory storing instructions comprising:
a life-log information collection unit configured to collect one or more real life-log data entries relating to a real event associated with a user account, each of the one or more real life-log data entries being associated with an event and a time;
a misleading life-log data generator unit configured to, in response to a request from the user account, generate one or more misleading life-log data entries relating to a false event, based on prior real life-log data entries associated with the user account or another user account, each of the prior real life-log data entries being associated with a prior event and a prior time, the prior time associated with the prior real life-log data entry being same as the time associated with the real life-log data entry but on a previous day;
a life-log data management unit configured to replace the one or more real life-log data entries with the one or more misleading life-log data entries; and
a life-log data entry transmitter unit configured to transmit, to a social networking service (SNS) server, the one or more misleading life-log data entries generated by the misleading life-log data entry generator unit, in response to the request from the user account,
wherein the life-log data entry transmitter unit is further configured to transmit, to the SNS server, the one or more real life-log data entries relating to the real event in absence of the request from the user account.

18. The life-log system of claim 17, wherein the instructions further comprise:
a user input receiver unit configured to receive the request from the user account, wherein the request is associated with changing the one or more real life-log data entries relating to the real event.

* * * * *